United States Patent [19]

Takanashi et al.

[11] Patent Number: 4,975,776
[45] Date of Patent: Dec. 4, 1990

[54] IMAGE PICKUP APPARATUS HAVING A PHOTOCONDUCTIVE SECTION

[75] Inventors: Itsuo Takanashi, Kamakura; Shintaro Nakagaki, Fujisawa; Hirohiko Shinonaga; Tsutou Asakura, both of Yokohama; Masato Furuya, Yokosuka, all of Japan

[73] Assignee: Victor Company of Japan, Yokohama, Japan

[21] Appl. No.: 381,911

[22] Filed: Jul. 19, 1989

[30] Foreign Application Priority Data

Jul. 22, 1988 [JP] Japan .................................. 63-182974

[51] Int. Cl.$^5$ .............................................. H04N 5/30
[52] U.S. Cl. .................................. 358/209; 358/213.13
[58] Field of Search ................... 358/209, 211, 213.13, 358/217–219, 225

[56] References Cited

U.S. PATENT DOCUMENTS

| | | | |
|---|---|---|---|
| 3,577,200 | 5/1971 | Aldrich | 358/213.13 |
| 3,716,747 | 2/1973 | Patel | 358/213.13 |
| 4,641,193 | 2/1987 | Glenn | 358/213.13 |
| 4,727,427 | 2/1988 | Kime | 358/217 |
| 4,831,452 | 5/1989 | Takanashi et al. | 358/209 |

*Primary Examiner*—Stephen Brinich
*Attorney, Agent, or Firm*—Pollock, VandeSande & Priddy

[57] ABSTRACT

There is disclosed herein an image sensing device of an image pickup apparatus which produces an image signal corresponding to an optical image of an object taken through the image pickup apparatus. The image sensing device includes an photoconductive member responsive to the optical image on one surface thereof to produce an charge image corresponding to the optical image on the other surface under a predetermined electric field and a change holding member arranged so that an electrostatic latent image is formed on one surface thereof. The charge holding member is disposed to be opposed relation to the photoconductive member and first and second electrodes are respectively disposed on the photoconductive member and the charge holding member. Also included in the device is a voltage application circuit comprising a change-over switch and a power source so that a voltage of the power source is applicable to the first and second electrodes. The operation of the switch is controlled by a switch control unit so as to allow and interrupt the application of the voltage of the power source to the first and second electrodes. Discharging between the members is developed in response to application of the voltage thereto so that a charge image is formed on the charge holding member in correspondance with the charge image formed on the photoconductive member.

7 Claims, 5 Drawing Sheets

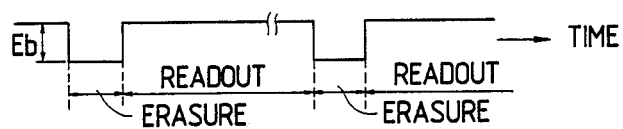
FIG. 10
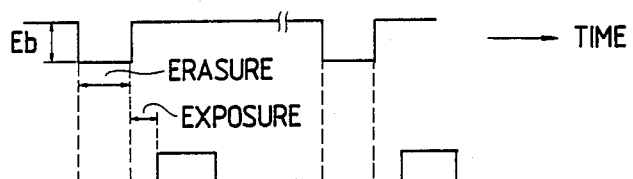
FIG. 11a
FIG. 11b
FIG. 11c
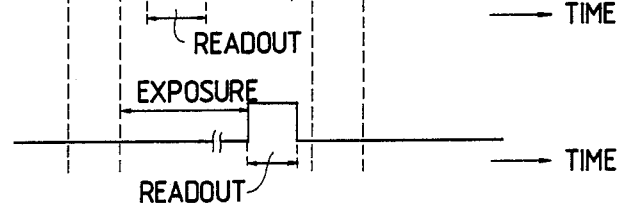
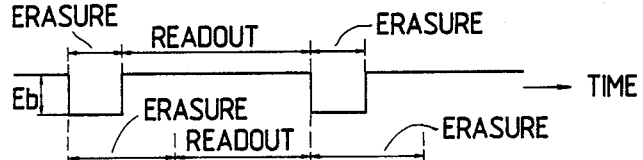
FIG. 12a
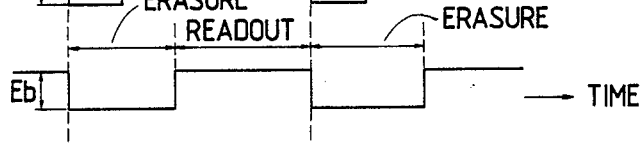
FIG. 12b
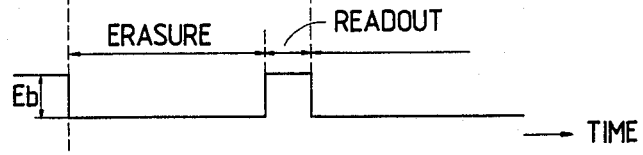
FIG. 12c

IMAGE PICKUP APPARATUS HAVING A PHOTOCONDUCTIVE SECTION

BACKGROUND OF THE INVENTION

The present invention relates to an image pickup apparatus which is capable of generating an image signal to reproduce an image with high quality and high resolution.

Generally, improvement of the resolution of a reproduction image corresponding to an object taken by an image pickup apparatus such as a video camera depends upon an image signal produced through an image sensing device provided in the image pickup apparatus so as to sense an optical image from the object. In an image pickup apparatus of the type using an image pickup tube, or camera tube, as the image sensing device, because of the limitations imposed on microscopic reduction of the diameter of an electron beam in the image pickup tube, difficulty is encountered to attain the high resolution through the microscopic reduction of the electron beam diameter, and further since the capacity of a photo-electric conversion target of the image pickup tube increases in accordance with the area of the target, difficulty is also encountered to realize the high resolution by enlarging the target area. That is, due to the performance of the electron gun and the structure of the focusing system of the image pickup tube, there is a limit in increasingly heightening the resolution by the microscopic reduction of the diameter of the electron beam. Further, because of reduction of the high-frequency signal component of the output signal of the image pickup tube due to increase in a capacitance of the target capacity caused by increase in the target area, the S/N of the image pickup tube output signal is extremely deteriorated so as to make it difficult to adequately produce an image signal which can produce an image with high quality and high resolution.

In addition, in order to develop a reproduced image with high quality and high resolution in an image pickup apparatus equipped with a solid-state image sensing device, the solid-state image sensing device should be arranged to have a large number of pixels. However, such a solid-state image sensing device requires a clock signal with a high frequency in driving, and since the capacitance value of a driven circuit is heightened due to increase in the number of the pixels, such a solid-state image sensing device may be difficult to be arranged for a practical application when taking into account the fact that the limit of the frequency of the clock signal is 20 MHz.

SUMMARY OF THE INVENTION

It is therefore an object of the present invention to provide an image pickup apparatus which is capable of providing a reproduction image with high quality and high resolution.

With this and other features which will become apparent as the description proceeds, in accordance with the present invention, there is provided an image sensing device for use in an image pickup apparatus which produces an image signal in correspondance with an optical image of an object taken through said image pickup apparatus and projected thereto, comprising: an photoconductive section including an photoconductive member arranged to be responsive to the optical image of the object on one surface thereof to produce an electric charge image corresponding to the optical image of the object on the other surface under a predetermined electric field and first electrode means, one surface of said photoconductive section being disposed to be directed to the object to receive the optical image of the object; a charge holding section including a change holding member arranged so that an electrostatic latent image is formed on one surface thereof and the formed electrostatic latent image is allowed to be kept as it is and second electrode means, one surface of the charge holding section being disposed to be opposed relation to the other surface of the photoconductive section so that the charge holding member faces the photoconductive member of the photoconductive section; voltage application circuit means including switching means and power source means so that a voltage of the power source means is applicable to the first electrode means of the photoconductive section and the second electrode means of the charge holding section in accordance with operation of the switching means; and switch control means arranged to generate a switch control signal for controlling the operation of the switching means so as to allow and interrupt the application of the voltage of the power source means to the first and second electrode means, discharging between the photoconductive member and the charge holding member being developed in response to the application of the voltage of the power source means so that the electrostatic latent image is formed on the one surface of the charge holding member in correspondance with the electric charge image formed on the other surface of the photoconductive member.

Preferably, the switching means is a change-over switch comprising a movable contact and first and second fixed contacts and the power source means includes first power source which allows supply of a first predetermined voltage and second power source which allows supply of a second predetermined voltage lower than the first voltage of the first power source, the first fixed contact being coupled to the first power source and the second fixed contact being coupled to the second power source so that the discharging between the photoconductive member and the charge holding member is allowed in response to the application of the first predetermined voltage to the first and second electrode means only when the movable contact switched to the first contact.

In accordance with the present invention, there is further provided an image pickup apparatus for generating an image signal in response to an optical image of an object to be taken by said imagepickup apparatus, comprising: image sensing means responsive to said optical image of said object introduced thereinto from one surface thereof to produce an electric charge image corresponding to said optical image thereof, said image sensing means being arranged so that the produced electric charge image is allowed to be read out by a first predetermined light beam introduced thereinto from the other surface thereof and erased by a second light beam introduced thereinto from the other surface thereof, said image sensing means including first and second electrode means to establish an electric field therebetween under the condition of application of a predetermined voltage; voltage application circuit means including a change-over switch and a power source for applying said predetermined voltage to said first and second electrode means, said change-over switch being coupled to said power source so that the application of said predetermined voltage to said first and second electrode means is allowed and interrupted in accordance with operation of said change-over switch; readout means for generating said first predetermined light beam to read out information corresponding to the produced electric charge image; erasing means for generating said second predetermined light beam to erase the produced electric charge image; and control means coupled to said voltage application circuit means, said readout means and said erasing means to control operations thereof to successively perform the erasure and the readout of the formed charge image at predetermined timings, said control means controlling the erasing time period to determine a writting time period of said optical image.

In accordance with the present invention, there is still further provided an image pickup apparatus for generating an image signal in response to an optical image of an object to be taken by said imagepickup apparatus, comprising: image sensing means responsive to said optical image of said object introduced thereinto from one surface thereof to produce an electric charge image corresponding to said optical image thereof, said image sensing means being arranged so that the produced electric charge image is allowed to be read out by a first predetermined light beam introduced thereinto from the other surface thereof and erased by a second light beam introduced thereinto from the other surface thereof, said image sensing means including first and second electrode means to establish an electric field therebetween under the condtion of application of a predetermined voltage; voltage application circuit means including a change-over switch and a power source for applying said predetermined voltage to said first and second electrode means, said change-over switch being coupled to said power source so that the application of said predetermined voltage to said first and second electrode means is allowed and interrupted in accordance with operation of said change-over switch; readout means for generating said first predetermined light beam to read out information corresponding to the produced electric charge image; erasing means for generating said second predetermined light beam to erase the produced electric charge image; and control means coupled to said voltage application circuit means, said readout means and said erasing means to control operations thereof to perform the erasure and the readout of the formed charge image at predetermined timings, said control means controlling a time period between the termination of the erasure and the start of the readout to determine a writting time period of said optical image.

BRIEF DESCRIPTION OF THE DRAWINGS

The object and features of the present invention will become more readily apparent from the following detailed description of the preferred embodiments taken in conjunction with the accompanying drawings in which:

FIGS. 10 through 12 are illustrations for describing the operation of the FIG. 7 image pickup apparatus.

DETAILED DESCRIPTION OF THE INVENTION

Figure 1:
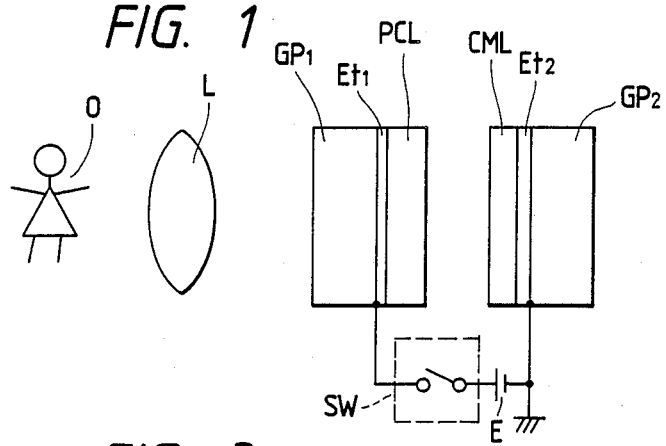
FIG. 1 is an illustration of an embodiment of an image sensing device of an image pickup apparatus according to the present invention.

Referring now to FIG. 1, there is illustrated an embodiment of an image sensing device of an image pickup apparatus according to the present invention, the image pickup apparatus being arranged so as to produce an image signal corresponding to an optical image of an object introduced thereinto. The image sensing device comprises an photoconductive section and a charge holding section which are spaced by a predetermined distance from each other and disposed to be in opposed relation to each other. The photocondutive section includes a transparent substrate (For example, a glass substrate) GP1 facing an image-pickup lens L, an photoconductive member (layer) PCL facing the charge holding section and a transparent electrode Et1 interposed therebetween. Light from an object 0 viewed through the image pickup apparatus is directed to the photoconductive section after passed through the image-pickup lens L and incidents to the transparent substrate GP1. The light carrying optical information of the object 0 passes through the transparent substrate GP1 and the transparent electrode Et1 and then reaches one surface of the photoconductive member PCL. The photoconductive member is made of an photoconductive material (for example, amorphous - silicon) having a chanrateristic which can produce an electric charge image with high definition on the other surface thereof in response to the optical image given on the one surface thereof under the condition of application of a predetermined electric field. Further, the photoconductive member PCL has a charactersitic in which the electrical resistance varies in accordance with the intensity of light incident thereon.

On the other hand, the charge holding section includes a substrate GP2, a charge holding member (layer) CML and an electrode Et2 interposed therebetween, the charge holding member CML being positioned to be in opposed relation to the photoconductive member PCL of the photoconductive section. Here, the substrate GP2 and electrode Et2 are not required to be of the transparent type. The charge holding member is made of a material (for example, a silicon resin) having a high insulation resistance so as to allow keeping, for a prolonged time, the pattern of an electrostatic latent image (charge image) formed on a surface thereof.

Figure 2A:
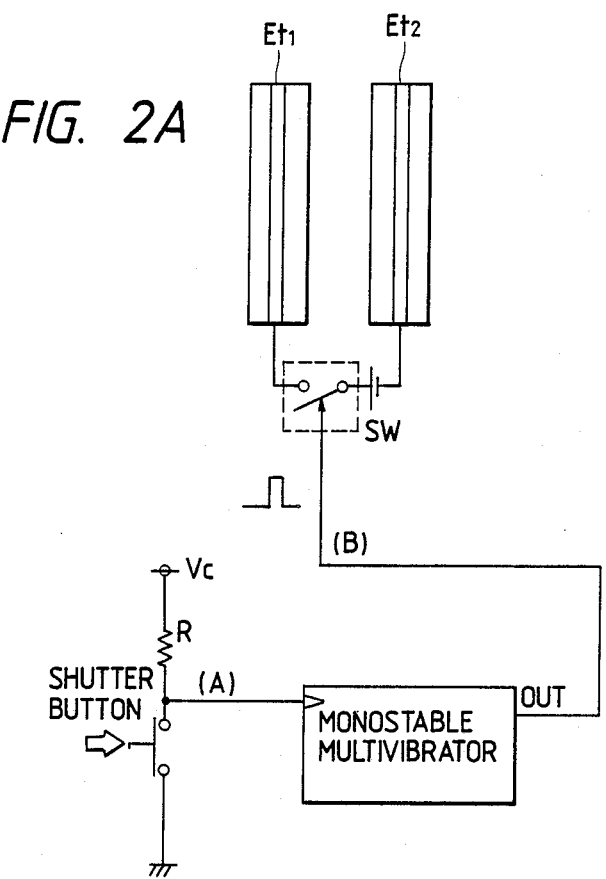
FIG. 2A is a block diagram showing a switch control curcuit for controlling a change-over switch of the FIG. 1 image sensing device.
Figure 2B:
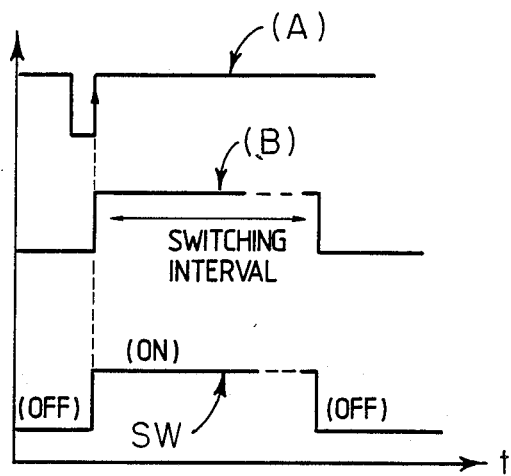
FIG. 2B is a timing chart for describing the operation of the FIG. 2A switch control circuit.

The transparent electrode Et1 and electrode Et2 are coupled through a voltage-application control circuit to each other, the voltage-application control circuit comprising a change-over switch SW, a switch control circuit and a power source E so that a predetermined voltage is applied to the transparent electrode Et1 and electrode Et2 when the switch SW takes the ON state under control of the switch control circuit. One example of arrangement of the switch control circuit is illustrated in FIG. 2A where a monostable multivibrator generates a switch-on signal (a pulse signal whose duration depends on its own time constant) (B) in response to an impulse (A) produced by operation of a shutter button as shown in FIG. 2B illustrating the opening and closing operation of the change-over switch SW made in accordance with operation of the shutter button. Here, the change-over switch SW may be constructed by an electromagnetic relay, for example.

In response to the closure of the change-over switch SW, the predetermined voltage due to the power source E is applied to the transparent electrode Et1 and the electrode Et2 so as to establish an electric field therebetween. Under this condition, when the optical image is formed on the surface of the photoconductive member PCL in accordance with optical information from the object O, the electrical resistance values of portions of the photoconductive member PCL are varied in correspondance with the light intensities of portions of the formed optical image so as to produce on the other surface thereof an electric charge image. In response to the production of the electric charge image, discharging occurs between the photoconductive member PCL and the charge holding member so that an electrostatic latent image is formed on the surface of the charge holding member CML facing the charge-image-formed surface of the photoconductive member PCL in the manner disclosed in the European patent application No. 89 300 633.8 filed by the applicant of the present invention. The predetermined voltage due to the power source E is determined so as to allow the discharging therebetween.

Thus, in the image sensing device of this embodiment, the formation of the electrostatic latent image on the surface of the charge holding member CML depends upon the operation of the change-over switch SW, that is, the formation thereof is made only when the change-over switch SW is in the closed state but not given when it is in the opened state. This results in providing a shutter effect to the image pickup apparatus. The shutter speed control and exposure control can be effected by controlling the time period that the change-over switch SW takes the closed state, for example, by adjusting the time constant of the above-mentioned monostable multivibrator of the switch control circuit.

The readout of the electrostatic latent image on the charge holding member may be effected by an appropriate means to produce an image signal which can develop a reproduction image with high quality and high resolution. Further, in the case that the image sensing device of this embodiment is employed for a color image pickup apparatus, the above-mentioned electrostatic latent image forming process may be performed for each of the three primary color images separated by an appropriate color separation optical system.

Here, it is also appropriate that the charge holding member CML is arranged so as to, after formation of a complete electrostaic latent image, be shifted up to a position that the latent-image-formed region is not in opposed relation to the photoconductive member PCL and a newly image-forming region takes the position that it is in the opposed relation thereto.

FIGS. 3 through 6 are illustrations of various modifications of the present invention in which parts corresponding to those in FIG. 1 are marked with the same reference and the description will be omitted for brevity.

Figure 3:
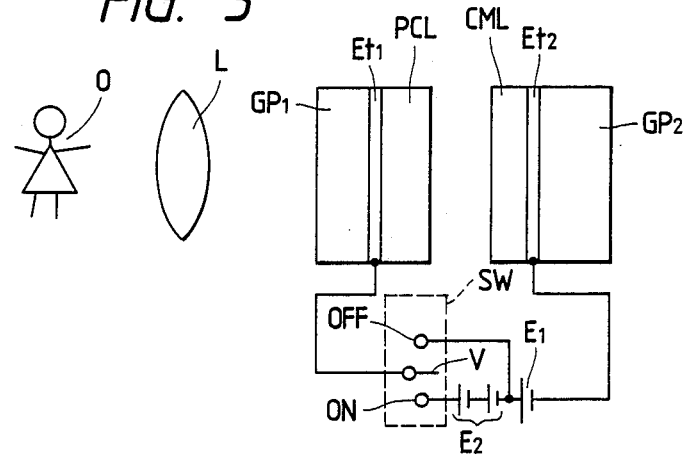
FIGS. 3 through 6 are illustrations of further embodiments of this invention.

One difference between the image sensing device illustrated in FIG. 3 and the FIG. 1 image sensing device is that the voltage-application control circuit comprises a change-over switch SW and two power sources E1 and E2 coupled in series to each other. The change-over switch SW is composed of a movable contact v and two fixed contacts on and off, the fixed contact on being connected to a point between the two power sources E1 and E2, i.e., the plus side of the power source E1, and the fixed contact off being connected to the plus side of the power source E2. The movable contact v is switchable between both the fixed contacts on and off in accordance with a switching signal from a switch control circuit. When the movable contact v is switched to the fixed contact on side, i.e., connected to the fixed contact on, the sum of the voltages of the power sources E1 and E2 is applied to a transparent electrode Et1 of the photoconductive section and an electrode Et2 of the charge holding section. On the other hand, when the movable contact v is switched to the fixed contact off side, only the voltage of the power source E1 is applied thereto. The voltages due to the power sources E1 and E2 are arranged so that the discharge is allowed between the photoconductive member PCL and the charge holding member CML, that is, an electrostatic latent image is formed on a surface of the charge holding member CML, when the sum of the voltages of the power source E1 and E2 is applied to the transparent electrode Et1 and the electrode Et2 but not developed therebetween when only the voltage of the power source E1 is applied thereto. Ordinarily, the movable contact v is switched to the fixed contact off side so that the voltage of the power source E1 is applied thereto so as to act as a bias voltage. In this instance, even when an optical image of the object O is formed on the surface of the photoconductive member PCL so that the electrical resistance of the photoconductive member PCL varies in correspondance with the light intensity of the optical image, an electrostatic latent image is not developed on the surface of the charge holding member CML because of no discharging. An advantage of the FIG. 3 image sensing device is a use of a change-over switch Sw having a lower maximum voltage rating pressure as compared with that of the FIG. 1 image sensing device.

Figure 4:
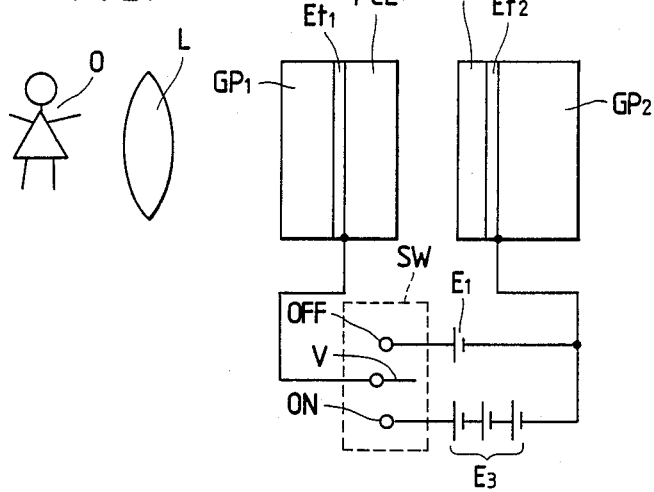

In FIG. 4, the image sensing device includes a voltage-application control circuit different from that of the FIG. 1 or 3 image sensing device. The voltage-application control circuit of FIG. 4 image sensing device includes power sources E1 and E3 which are disposed to be in a selectable arrangement and either of which is used for application of a voltage to a transparent electrode Et1 and an electrode Et2 in accordance with operation of a change-over switch SW. The change-over switch Sw comprises a movable contact v and fixed contacts on and off, the movable contact v being arranged to be coupled to either the fixed contact on or off as well as the change-over switch SW of the FIG. 3 image sensing device. The fixed contact on is connected to the power source E3 and the fixed contact off is connected to the power source E1. Here, the relation between the voltages of the power sources E1, E2 and E3 of the FIGS. 3 and 4 image sensing devices is E3=E1+E2, that is, the discharging between an photoconductive member PCL and a charge holding member CML is allowed when the voltage E3 is applied to the transparent electrode ET1 and electrode Et3 is applied to the transparent electrode Et1 and electrode Et2, while the discharge therebetween is not developed when the voltage E1 is applied to both the electrodes Et1 and Et2.

Figure 5:
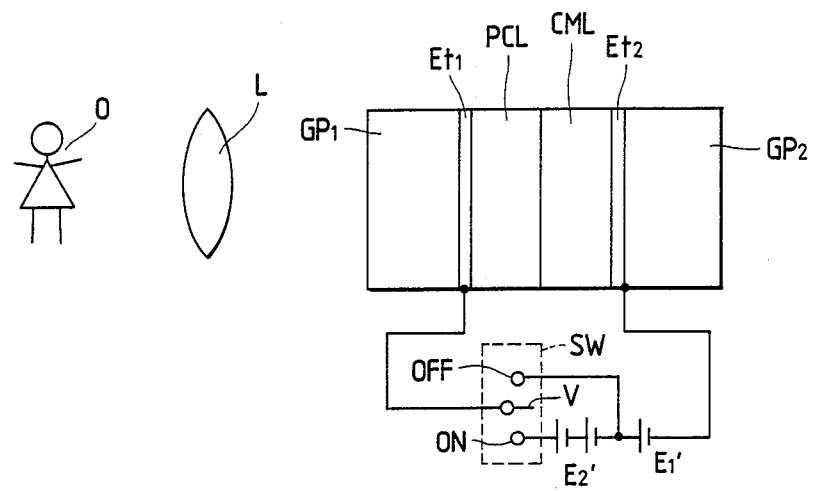
Figure 6:
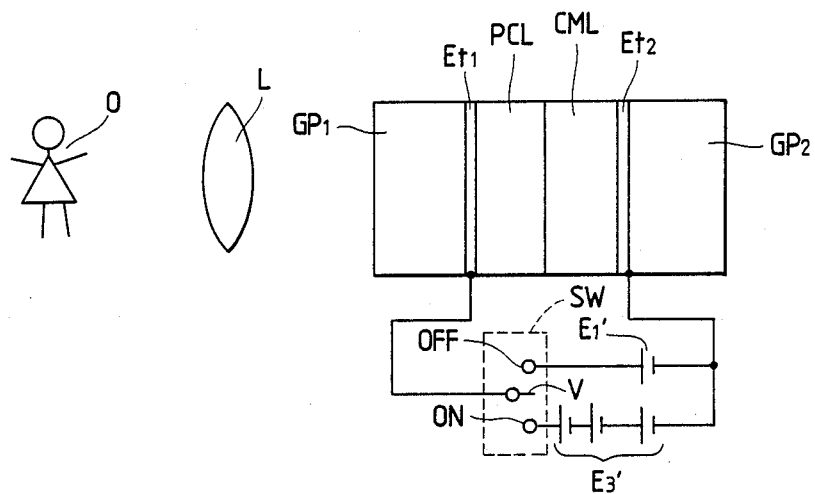

In FIGS. 5 and 6, the photoconductive section and the charge holding section are tightly coupled to each other or disposed to be in extremely short spacing relation to each other. In the FIGS. 5 and 6 image sensing device, the voltage-application control circuits have arrangements respectively corresponding to those in the FIGS. 3 and 4 image sensing devices. In this instance, each of the the voltages of the power sources E1', E2' and E3' is allowed to be lowered than that of each of the power sources E1, E2 and E3 of the FIGS. 3 and 4 image sensing devices.

Figure 7:
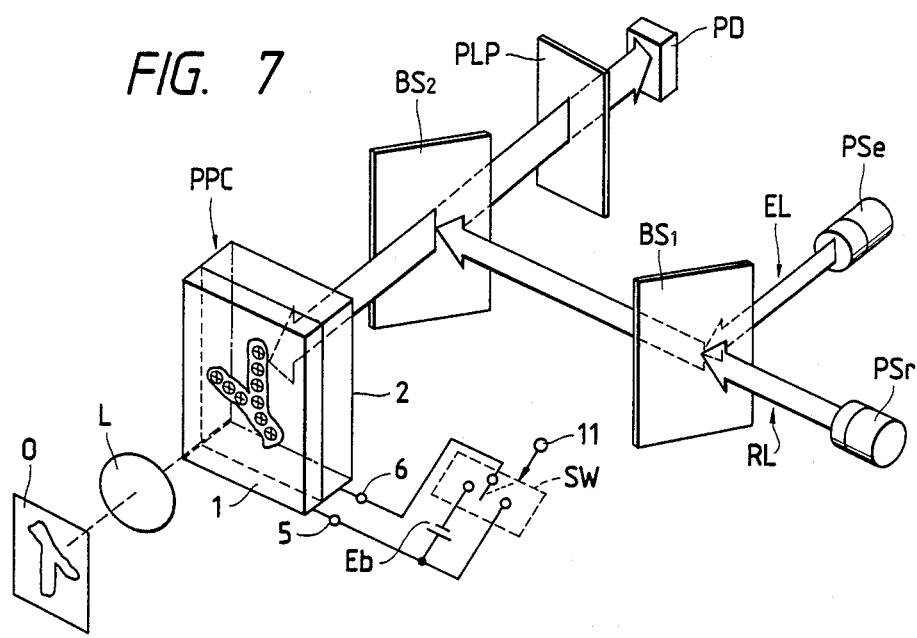
FIG. 7 shows an arrangement of an image pickup apparatus according to the present invention.
Figure 8:
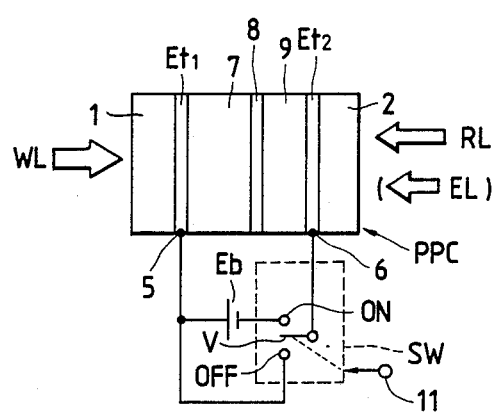
FIG. 8 shows an image sensing device employed for the FIG. 7 image pickup apparatus.

FIG. 7 shows a further embodiment of an image pickup apparatus according to the present invention. The image pickup apparatus includes an image sensing device PPC whose arrangement is an illustrated in FIG. 8. In FIG. 8, the image sensing device PPC comprises two transparent substrates (for example, glass plate) 1 and 2 which are disposed at both ends thereof. An photoconductive member 7 is disposed at the inside of the transparent substrate 1 with a transparent electrode Et1 being interposed therebetween and an optical member 9 being disposed at the inside of the transparent substrate 2 with another transparent electrode Et2 being interposed therebetween. Also included in the image sensing device PPC is a dielectric mirror 8 sandwiched between the photoconductive member 7 and the optical member 9. The dielectric mirror 8 is made of a material having a light transmittance characteristic which allows transmission of a predetermined light beam but not permit transmission of another predetermined light beam, that is, which reflects a readout light beam RL and transmits an erasing light beam EL. The optical member 9 is constructed of a member (for example, a photo-modulation member such as niobic acid lithium monocrystal or nematic liquid crystal) which can vary a mode of light in accordance with the intensity distribution of an electric field. The photoconductive member 7 corresponds to the photoconductive member PCL in the above-mentioned embodiments.

The image sensing device PPC further includes a voltage-application control circuit comprising a change-over switch SW and a power source Eb so that the voltage of the power source Eb is applied through terminals 5, 6 to the transparent electrodes Et1 and Et2. The change-over switch SW is composed of movable contact v and two fixed contacts on and off, the movable contact v being switchable between the two fixed contacts on and off in accordance with a switch control signal supplied from an appropriate switch control circuit through a terminal 11. The voltage of the power source Eb is arranged to be applied to the transparent electrodes Et1 and Et2 when the movable contact v of the change-over switch SW is switched to the fixed contact on side, but not applied thereto when the movable contact v is switched to the fixed contact off side.

Under the condition that the voltage of the power source Eb is applied to the transparent electrodes Et1 and Et2 so as to establish an electric field therebetween, when a writting light beam (optical image) WL carrying optical information of the object reaches the photoconductive member 7 after passed through the transparent substrate 1 and the transparent electrode Et1, the electrical resistance of the photoconductive member 7 varies in correspondance with the incident writing light beam whereby an electric charge image corresponding to the optical image is produced on a boundary surface between the photoconductive member 7 and the dielectric mirror 8. Here, the optical member 9, disposed to be in serial relation to the dielectric mirror 8, takes a state that an electric field with intensity distribution corresponding to the optical image is applied, and the index of refraction of the optical member 9 varies in accordance with the electric field by means of the electro-optical effect so as to vary in correspondence with the electric charge image produced on the boundary surface of the photoconductive member 7 and the dielectric mirror 8.

In this condtion, when the readout light beam R1 with a predetermined light intensity is directed from a light source toward the transparent substrate 2 side of the image sensing device and introduced thereinto, the readout light beam RL is reflected on the dielectric mirror 8 to return toward the transparent substrate 2. Since as described above the index of refraction of the optical member 9 is varied in accordance with the electric field, the reflected light of the readout light beam RL is modulated with the image information corresponding tot he intensity distribution of the electric field to produce an optical image corresponding to the optical image incident on the transparent substrate 1 side.

For erasure of the information written by the writting light beam WL, with the movable contact v being switched to the fixed contact off side, the erasing light beam EL with uniform intensity distribution is introduced from the transparent substrate 2 side thereinto.

Figure 9:
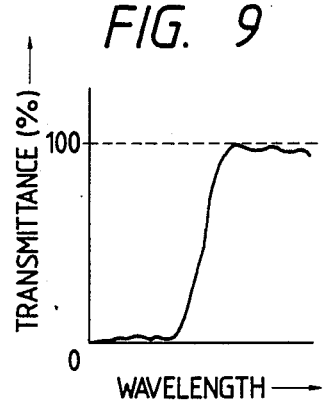
FIG. 9 is a graphic diagram showing the relation between the light transmittance and light wavelength.

Returning again to FIG. 7, the optical image of the object O is incident as the writing light beam WL on the image sensing device PPC through an image-pickup lens L from the transparent substrate 1 side. The incident writing light beam WL reaches the photoconductive member 7 after passed through the transparent substrate 1 and transparent electrode Et1, and a charge image corresponding to the optical image is produced on the boundary surface between the photoconductive member 7 and the dielectric mirror 8 under the condition that the image sensing device PPC takes the writting mode, that is, the movable contact v of the change-over switch Sw is switched to the fixed contact on side to cause the voltage of the power source Eb to be applied to the transparent electrodes Et1 and Et2. In this state, when the image sensing device PPC is switched from the writting mode to the readout mode, the readout light beam RL (coherent light) emitted from a light source PSr (for example, laser-light flaying-spot scanner is incident on the image sensing device through beam splitters BS1 and BS2 so as to read out the optical image information corresponding to the produced charge image. The readout light beam RL is reflected on the dielectric mirror 8 to return toward the transparent substrate 2 side. The reflected light beam being modulated with the image information, after issued from the transparent substrate 2, is led through the beam splitter BS2 and a polarization plate PLP to an image detector PD which in turn outputs an image signal corresponding to the optical image of the object O. On the other hand, the erasing light beam EL is emitted form a light source PSe and incident on the image sensing device PPC through the beam splitters BS1 and BS2. Here, the dielectric mirror 8 allows to pass the erasing light beam EL by its own wave-length selection characteristic. FIG. 9 shows the light-transmittance characteristic of the dielectric mirror 8 with respect to light wavelengths.

FIGS. 10 through 16 are timing charts illustrating operation of the image pickup apparatus of this embodiment including the control of the change-over switch SW, erasing light source PSe and readout light source PSr by means of an appropriate control curcuit or a microcomputer. The erasing, writting and readout for each of different image information of the object O are successively effected at every one-frame time period. The erasing operation is effected from start of the one-frame time period for a predetermined time period which is determined to correspond to the vertical blanking time period of the image signal to be outputted from the image detector PD. In the cases illustrated in FIG. 10, (a) of FIG. 11 and (a) of FIG. 12, with the writting light beam WL being introduced into the image sensing device PPC, the erasing is effected during the vertical blanking time period and readout is then effected so as to take the ordinary motion-picture image pickup mode. On the other hand, in the cases illustrated in (b) and (c) of FIG. 11, the erasing is effected during the vertical blanking time period and the exposure is effected for the time period between the start of the readout and the termination of the erasing and the readout is then performed for a predetermined time period. Here, the time period between the termination and the start of the readout is selectively varied to change the exposure time period so as to be equivalently changeable with respect to the shutter speed. The shutter speed corresponds to the exposure time period. Furthermore, in the cases shown in (b) and (c) of FIG. 12, the erasing starts in the vertical blanking time period and the readout is performed for the time period between the termination of the erasing and the beginning of the next vertical blanking time period. Here, the erasing time period is varied so as to vary the exposure time period to be equivalently changeable in terms of the shutter speed.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. An image sensing device for use in an image pickup apparatus which produces an image signal in correspondance with an optical image of an object taken through said image pickup apparatus and projected thereto, comprising:

an photoconductive section including an photoconductive member arranged to be responsive to said optical image of said object on one surface thereof to produce an electric charge image corresponding to said optical image of said object on the other surface under a predetermined electric field and first electrode means, one surface of said photoconductive section being disposed to be directed to said object to receive said optical image of said object;

a charge holding section including a change holding member arranged so that an electrostatic latent image is formed on one surface thereof and the formed electrostatic latent image is allowed to be kept as it is and second electrode means, one surface of said charge holding section being disposed to be opposed relation to the other surface of said photoconductive section so that said charge holding member faces said photoconductive member of said photoconductive section;

voltage application circuit means including switching means and power source means so that a voltage of said power source means is applicable to said first electrode means of said photoconductive section and said second electrode means of said charge holding section in accordance with operation of said switching means; and switch control means arranged to generate a switch control signal for controlling the operation of said switching means so as to allow and interrupt the application of the voltage of said power source means to said first and second electrode means, discharging between said photoconductive member and said charge holding member being developed in response to the application of the voltage of said power source means so that the electrostatic latent image is formed on the one surface of said charge holding member in correspondance with the electric charge image formed on the other surface of said photoconductive member.

2. An image sensing device as claimed in claim 1, wherein said switching means is a change-over switch comprising a movable contact and first and second fixed contacts and said power source means includes first power source which allows supply of a first predetermined voltage and second power source which allows supply of a second predetermined voltage lower than said first voltage of said first power source, said first fixed contact being coupled to said first power source and said second fixed contact being coupled to said second power source so that the discharging between said photoconductive member and said charge holding member is allowed in response to the application of the first predetermined voltage to said first and second electrode means only when said movable contact switched to said first contact.

3. An image sensing device as claimed in claim 1 wherein said photoconductive member and said charge holding member are disposed to be in substantially contacting relation to each other.

4. An image sensing device as claimed in claim 1, wherein said photoconductive member and said charge holding member are disposed to be spaced by a predetermined distance from each other.

5. An image sensing device as claimed in claim 1, wherein said first electrode means is of a transparent type so that said optical image of said object reaches the one surface of said photoconductive member after passed through said first electrode means.

6. An image pickup apparatus for generating an image signal in response to an optical image of an object to be taken by said imagepickup apparatus, comprising:

image sensing means responsive to said optical image of said object introduced thereinto from one surface thereof to produce an electric charge image corresponding to said optical image thereof, said image sensing means being arranged so that the produced electric charge image is allowed to be read out by a first predetermined light beam introduced thereinto from the other surface thereof and erased by a second light beam introduced thereinto from the other surface thereof, said image sensing means including first and second electrode means to establish an electric field therebetween under the condition of application of a predetermined voltage;

voltage application circuit means including a change-over switch and a power source for applying said predetermined voltage to said first and second electrode means, said change-over switch being coupled to said power source so that the application of said predetermined voltage to said first and second electrode means is allowed and interrupted in accordance with operation of said change-over switch;

readout means for generating said first predetermined light beam to read out information corresponding to the produced electric charge image;

erasing means for generating said second predetermined light beam to erase the produced electric charge image; and control means coupled to said voltage application circuit means, said readout means and said erasing means to control operations thereof to successively perform the erasure and the readout of the formed charge image at predetermined timings, said control means controlling the erasing time period to determine a writting time period of said optical image.

7. An image pickup apparatus for generating an image signal in response to an optical image of an object to be taken by said imagepickup apparatus, comprising:

image sensing means responsive to said optical image of said object introduced thereinto from one surface thereof to produce an electric charge image corresponding to said optical image thereof, said image sensing means being arranged so that the produced electric charge image is allowed to be read out by a first predetermined light beam introduced thereinto from the other surface thereof and erased by a second light beam introduced thereinto from the other surface thereof, said image sensing means including first and second electrode means to establish an electric field therebetween under the condition of application of a predetermined voltage;

voltage application circuit means including a change-over switch and a power source for applying said predetermined voltage to said first and second electrode means, said change-over switch being coupled to said power source so that the application of said predetermined voltage to said first and second electrode means is allowed and interrupted in accordance with operation of said change-over switch;

readout means for generating said first predetermined light beam to read out information corresponding to the produced electric charge image;

erasing means for generating said second predetermined light beam to erase the produced electric charge image; and control means coupled to said voltage application circuit means, said readout means and said erasing means to control operations thereof to perform the erasure and the readout of the formed charge image at predetermined timings, said control means controlling a time period between the termination of the erasure and the start of the readout to determine a writting time period of said optical image.

* * * * *